July 10, 1956
L. E. BRAYMER
2,753,760
MULTIPLE IMAGE TELESCOPE
Filed Sept. 25, 1948
2 Sheets-Sheet 2
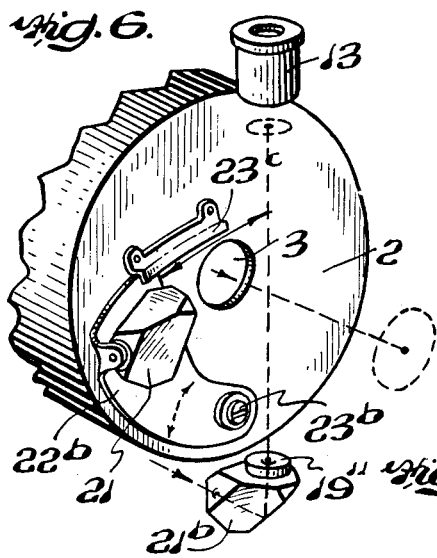
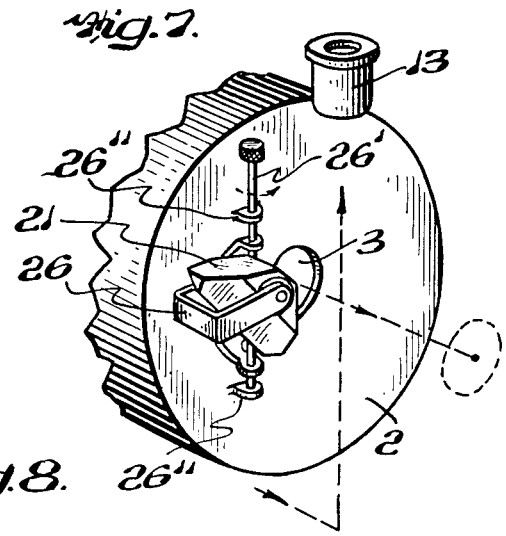
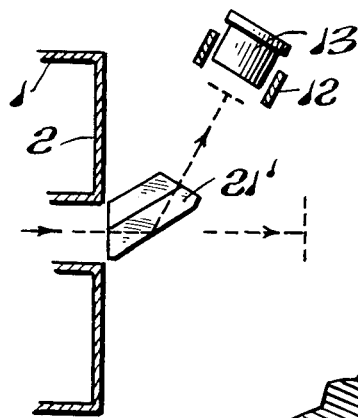
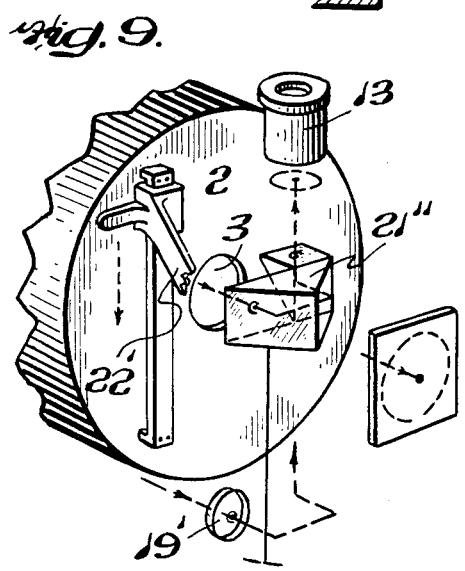
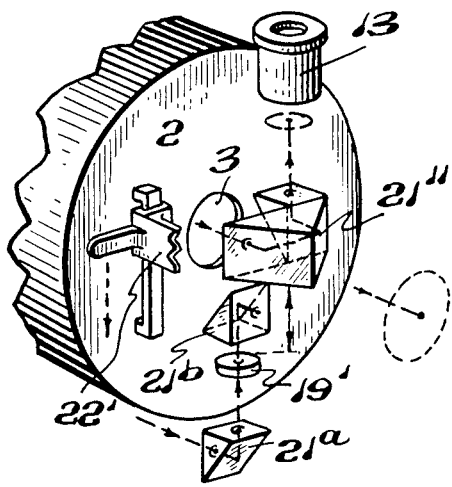
INVENTOR.
LAWRENCE BRAYMER
BY
HIS ATTORNEY

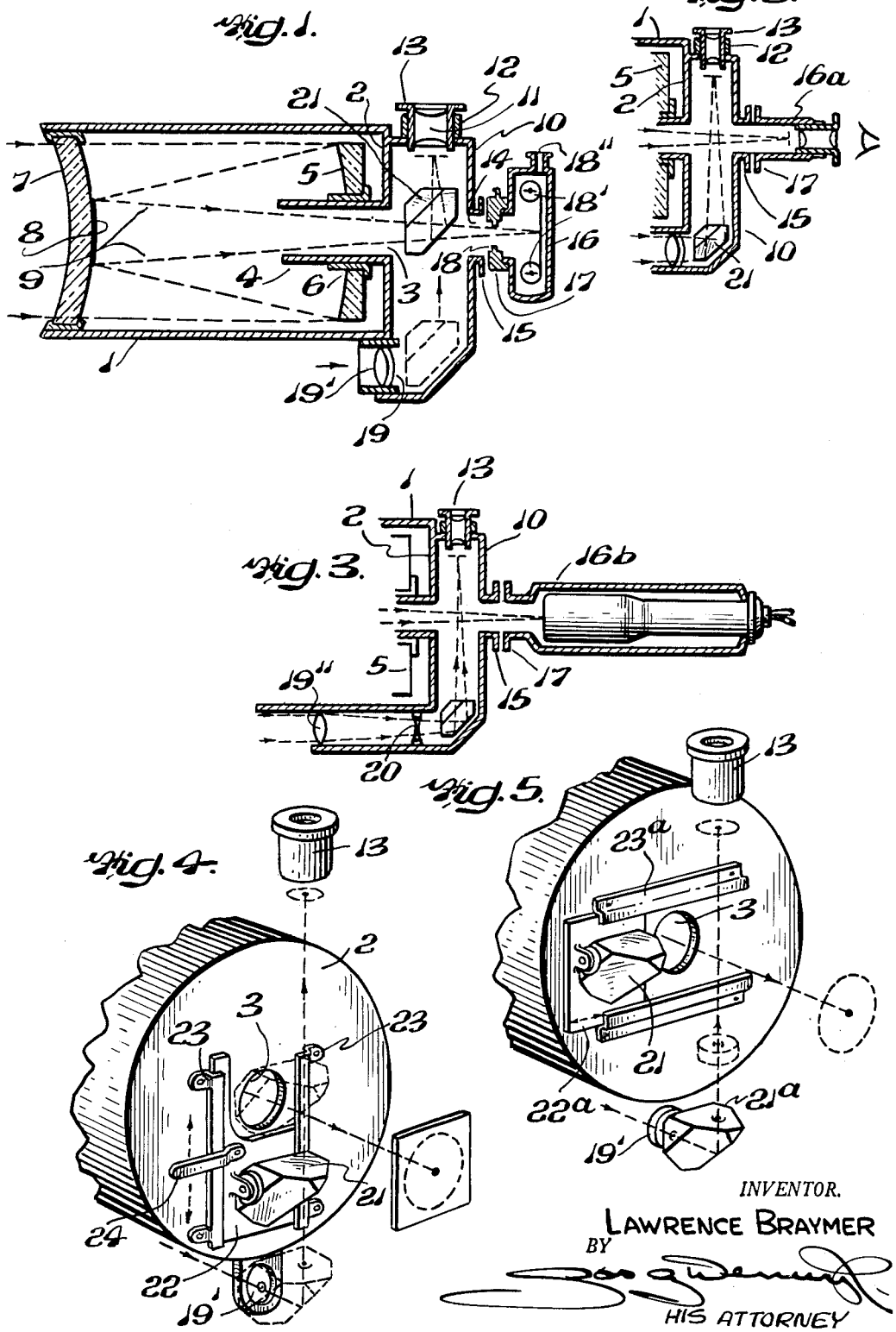

United States Patent Office 2,753,760
Patented July 10, 1956

2,753,760

MULTIPLE IMAGE TELESCOPE

Lawrence E. Braymer, Lahaska, Pa.

Application September 25, 1948, Serial No. 51,133

11 Claims. (Cl. 88—32)

My invention is a catadioptric telescope having means for focusing images formed by a single optical system upon different image planes disposed at an angle to one another, and preferably for also focusing images formed by several optical systems upon the same image plane.

My invention is particularly applicable to the Maksutov-Cassegrain type of telescope having a main optical system comprising an achromatic meniscus lens having a centrally disposed secondary mirror and a primary mirror co-axial therewith and containing a central opening through which image rays are converged by the secondary mirror to a focal image plane normal to the focal axis.

In accordance with my invention such image plane is surrounded by a housing having an opening and coupling co-axial with the optical axis for direct visual inspection of the image plane or preferably for the co-axial attachment of an ocular, camera obscura or other accessory. The housing also contains a peripheral opening and coupling for the attachment of an accessory, such as an ocular having an optical axis transverse to a projection of the axis common to the mirrors. A mirror or reflecting prism is movably mounted in the housing into or out of registration with the central opening of the primary mirror and the optical axis co-axial therewith, so that when the prism is out of alignment with the mirror opening an image is formed in a plane normal to the common axis of the mirrors, but when the prism is aligned with the mirror opening, an image is formed in a plane transverse to the first image plane and preferably in the object focal plane of a radial ocular.

In a preferred embodiment of my invention, an auxiliary optical system is mounted on the telescope with its optical axis parallel with the optical axis of the main optical system. The auxiliary optical system is preferably of different focal length than the main optical system and has an enlarged field of view so as to provide an effective finder for the instrument.

The prism is preferably movable into alignment with the finder to bend the image rays focused thereby to focal points in the object focal plane of the radial ocular.

By my improvements, either the image formed by the finder or the image formed by the main optical system may be brought into view alternately in a single ocular; or images made by the finder and by the main optical system may be simultaneously brought into view through transverse oculars; or the image formed by the main optical system may be photographed or scanned through one accessory and observed intermittently by shifting such image to a different accessory, or the object may be continuously viewed through the latter accessory and the finder, while the image thereof formed by the main optical system is being photographed, scanned or viewed through another accessory.

The characteristic features and advantages of my invention will further appear from the following description and the accompanying drawings in illustration thereof.

In the drawings, Fig. 1 is a diagrammatic longitudinal sectional view of a telescope of the Maksutov-Cassegrain type embodying my invention; Fig. 2 is a diagrammatic fragmentary longitudinal sectional view of the telescope shown in Fig. 1 with an ocular substituted for the camera obscura shown in Fig. 1; Fig. 3 is a fragmentary longitudinal sectional view of the telescope shown in Fig. 1 with a camera obscura containing a television tube and having a modified form of finder; Fig. 4 is a fragmentary diagrammatic perspective view of the instrument shown in Fig. 1, with some details of structure added and some omitted; Fig. 5 is a diagrammatic perspective view of an instrument similar to that shown in Fig. 4 but with modified details; Fig. 6 is a diagrammatic perspective view of an instrument similar to that shown in Fig. 4 but with further modified details; Fig. 7 is a diagrammatic pespective view of an instrument similar to that shown in Fig. 4, but with further modified details; Fig. 8 is a fragmentary diagrammatic longitudinal sectional view of an instrument similar to that shown in Fig. 1, but with modified details; Fig. 9 is a fragmentary diagrammatic perspective view of an instrument similar to that shown in Fig. 4 with further modified details; and Fig. 10 is a fragmentary diagrammatic perspective view of an instrument similar to that shown in Fig. 9 but with modified details.

In the drawings, I have shown my invention embodied in a telescope of the Maksutov-Cassegrain type such as shown in my application, Serial No. 787,995, filed November 25, 1947, now U. S. Patent No. 2,670,656, and comprising an opaque barrel 1 having an end closure 2 containing a central opening 3 surrounded by an inwardly projecting tubular light shield 4. A spherically concave mirror 5 contains a central opening 6 and may be sleeved on the tube 4 and adjusted axially thereon for focusing. The opposite end of the barrel is closed by an achromatic meniscus lens 7 which supports a spherically convex secondary mirror 8 co-axial with the primary mirror 5 and opening 3, and positioned within the focal length of the primary mirror 5. Image rays entering the barrel through the meniscus lens 7 are converged by the primary mirror 5 on the secondary mirror 8. The rays lying within a right cone 9 co-axial with the mirror 8 are converged thereby through the tube 4 toward a focal image plane beyond the closure 2 and whose position may be adjusted by axially adjusting the primary mirror 5.

A housing 10 is formed on or secured to the closure 2 and contains a radial opening 11 surrounded by a cylindrical sleeve 12 for receiving an accessory such as the ocular 13. The housing 10 also contains an opening 14 co-axial with the mirrors 5 and 8 and hence with the optical axis of the instrument. The opening 14 is surrounded by a sleeve or coupling 15 for the attachment of an accessory adapted to receive and utilize the image rays converged by the mirror 8 toward an image focal plane transverse to the axis of the mirrors 5 and 8.

In the form of my invention illustrated in Fig. 1, the accessory comprising a camera obscura 16 having a coupling member 17 complementary to the coupling member 15 and provided with a shutter 18 and with rollers 18' for supporting a surface coated with a film of photographic emulsion, such as an ordinary photographic film, and with a slot 18'' for inserting a photographic plate (not shown). The camera obscura 16 positions the photo sensitive surface in a plane coincident with the focal image plane which lies at right angles to the axis of the mirrors 5 and 8.

In the embodiment of my invention, illustrated in Fig. 2, the accessory 16a, coupled to the coupling member 15 of the housing in place of the camera obscura 16, consists of a sleeve for an ocular having an object plane coincident with an image focal plane of the mirrors 5 and 8 transverse to the common axis thereof, and this ocular may serve to position the eye of an observer, which is itself a form of camera obscura having a light sensitive surface formed by the retina.

In the embodiment of my invention illustrated in Fig. 3, the accessory comprises a camera obscura 16b coupled by the coupling 17 to the coupling member 15 and containing a television tube such as an iconoscope tube or image orthicon tube having a sensitive surface coincident with the image focal plane of the mirrors 5 and 8 normal to the common axis thereof.

In one embodiment of my invention, the housing 10 contains an opening 19 in a radial wall thereof adjacent to the periphery of the barrel 1. A finder 19' is seated in front of the opening 19 and may consist of a single objective lens having an axis parallel with the common axis of the mirrors 5 and 8, as shown in Figs. 1 and 2, or the finder may consist of a plurality of lens elements, such as the positive lens 19'' and negative achromatic lens 20 shown in Fig. 3 for providing a finder of greater focal length than that provided by a simple objective and which may approximate the focal length of the main optical system of the telescope.

A total reflecting prism 21 is housed in the housing 10 and movable therein into and out of alignment with the common optical axis of the mirrors 5 and 8, and, where an auxiliary finder is used, the prism 21 may be moved into or out of alignment with the axis of the finder.

In the form of the invention shown in Figs. 1 to 4, the total reflecting prism 21 is a 90 degree Amici Roof prism which is mounted on a slide 22 movable along a slideway 23 on the external face of the closure 2 within the housing 10. The slide 22 may be shifted by any suitable means, such as a handle 24, to move the prism 21 along the optical axis of the ocular 13 into or out of alignment with the common axis of the mirrors 5 and 8 and into or out of alignment with the optical axis of the finder.

The prism 21 has a flat face normal to the optical axis of the ocular 13; a flat face normal to the common axis of the mirrors 5 and 8 and to the optical axis of the finder 19', and a diagonal "roof" face connecting these two normal faces so as to bend rays at a right angle and erect the image both horizontally and vertically.

The finder will ordinarily be of shorter focal length and greater field of view than the main optical system. To locate an object, the prism 21 is aligned with the finder and the image rays from the object are thereby deflected to an image focal plane in the object plane of the ocular 13. When the object is found and centered, the prism 21 may be moved into alignment at the common axis of the mirrors 5 and 8 to thereby deflect the image rays converged by the focused mirrors toward the image focal plane which is coincident with the object focal plane of the ocular 13. When the object has been accurately centered and focused by viewing the image through the ocular 13 and adjusting the mirror 5, the prism may be moved away from the common axis of the mirrors 5 and 8 and the shutter 18 of the camera obscura operated to expose the light sensitive surface of the photographic film or the light sensitive surface of the iconoscope, which are parfocal with the object focal plane of the ocular 13.

During the photographing or scanning of the image formed by the mirrors 5 and 8, the prism 21 may be aligned with the finder and the image formed by the finder may be continuously or intermittently observed through the ocular 13. By attaching the ocular 16a in alignment with the axis of the mirrors 5 and 8 and positioning the prism 21 in alignment with the finder, as shown in Fig. 2, an object may be simultaneously observed by two persons to facilitate instruction or the like.

As illustrated in Fig. 5, the prism 21 may be mounted on a slide 22a which is slidable horizontally in guides 23a transversely to the optical axis of the ocular 13, and as shown in Fig. 6, the prism 21 may be mounted on a slide 22b which swings on a pivot 23b and along a slideway 23c so as to move the prism 21 along a path transverse to the optical axis of the ocular 13 into and out of alignment with the common axis of the mirrors 5 and 8.

A finder may be used in an instrument having its total reflecting prism movable transversely to the optical axis of an ocular, as shown in Figs. 5 and 6. In such case, an auxiliary total reflecting prism 21a may be positioned adjacent to and behind the finder objective 19' to deflect the image rays from the finder toward the object plane of the ocular 13, as indicated in Fig. 5 or a finder objective 19'' may be positioned above the total reflecting prism 21b having a face normal to the optical axis of the instrument. The positions of the parts will depend upon the chosen focal length of the objective 19' or 19''.

As illustrated in Fig. 7, a total reflecting prism 21 may be mounted in a cage 26 fixed to a vertical shaft 26' journaled in bearings 26'' on the closure 2 to permit the prism to be moved into or out of alignment with the common axis of the mirrors 5 and 8 to deflect image rays to the object plane of the ocular 13 or permit the focusing thereof in a focal plane normal to the common optical axis of the mirrors.

While it is ordinarily desirable that the optical axis of the peripheral ocular be normal to the common axis of the mirrors 5 and 8 and that a 90 degree total reflecting prism be used, this is not essential.

For instance, as indicated in Fig. 8, the ocular 13 may have its optical axis at an angle of 120 degrees to the common axis of the mirrors 5 and 8 and a 60 degree total reflecting prism 21' may be mounted on any of the supports shown in Figs. 4 to 7 and moved thereby into or out of alignment with the common axis of the mirrors 5 and 8.

Or, as shown in Figs. 9 and 10, the ocular 13, may be so mounted that its optical axis is not radial to the common axis of the mirrors 5 and 8 but is parallel to and spaced from a vertical radius from the latter axis. In such case a Porro prism 21'' may be mounted on a vertical slide 22' or on any of the supports shown in Figs. 4 to 7, and moved into or out of alignment with the common axis of the mirrors 5 and 8. When mounted as shown in Fig. 4 or 9 the prism 21'' also may be moved into alignment with the optical axis of the finder 19' to deflect rays therefrom toward the ocular 13, as indicated in Fig. 9.

To minimize the movement of the prism along the focal axis of the ocular 13, a pair of opposite prisms 21a and 21b may be provided to deflect rays from a finder toward the main prism 21'' as indicated in Fig. 10. When the prism 21'' is aligned with the opening 3, the image rays converged by the mirrors 5 and 8 are bent as indicated by the heavy dotted lines in Figs. 9 and 10 and focused in the object focal plane of the ocular 13. When the prism 21'' is lowered into alignment with the finder 19 (Fig. 9) or into alignment with the prism 21b (Fig. 10), the image rays converged by the finder 19' are converged toward the object focal plane of the ocular 13 and the image rays focused by the mirrors 5 and 8 are focused to an image plane normal to the common optical axis of such mirrors.

While it is preferable to effect the deflection of the image rays to the ocular 13 by means of reflecting and erecting prisms of the Amici roof type or Porro type, as shown, a plane mirror may be used in lieu of some or all of the prisms to provide a reflecting surface transverse to the optical axis of the focusing mirrors or to the optical axis of the finder and both prisms and plane mirrors are included in the terminology used in the claims.

Having described my invention, I claim:

1. A telescope comprising an optical system of finite focal length and having an optical axis, said system including means for converging rays emanating from an object toward an image focal plane, said means comprising a primary mirror and a secondary mirror having surfaces of complementary curvatures spaced along said optical axis, an independent, auxiliary optical system of different focal length than said first system and having an optical axis parallel to the optical axis thereof, said auxiliary system including means for converging rays toward an image focal plane, a reflector movable into operative relation with either of said optical systems and deflecting the rays converged by either of said systems in the same radial direction transverse to the optical axis thereof, an ocular having an axis transverse to the last named optical axis and in the path of rays deflected by said reflector from either of said optical systems, and means for positioning a light sensitive surface in operative relation to one of said first named image focal planes.

2. A telescope comprising image forming elements forming independent images of the same object from groups of image rays moving in parallel spaced paths, an ocular having an object plane transverse to said paths, and a reflector movable to intersect either of said groups and deflect either of them toward said object plane.

3. A telescope comprising a barrel having an end closure containing an axial opening, complementally focusing mirrors within said barrel and forming a system having an optical axis substantially concentric with said opening, a finder having an optical axis parallel with and offset from the axis of said system, an ocular having an optical axis transverse to said optical axes, and a reflector having a surface movable into either of said first two axes so as to lie transversely thereto and thereby deflect image rays from either said system or said finder into said ocular there being a straight unobstructed ray path from one of said mirrors to said axial opening when said reflector is in the axis of said finder.

4. A telescope comprising a barrel having at one end a closure containing a central opening, a lens at the other end of said barrel and having a mirror at its center, a mirror adjacent to said closure and co-axial with and axially adjustable relatively to said first mirror, said second mirror containing a central opening complementary to said first named opening, a finder adjacent to the periphery of said barrel and having an optical axis substantially parallel with but offset from the common axis of said mirrors, an ocular having an optical axis transverse to the common axis of said mirrors and to the optical axis of said finder and a reflector for deflecting image rays from either of said axes to said ocular, there being a straight unobstructed ray path between the mirror on said lens and said central opening when said reflector is positioned to deflect rays from said finder to said ocular.

5. A telescope as set forth in claim 4 wherein the reflector comprises a prismatic system.

6. A telescope comprising image forming optical systems having optical axes having portions parallel to one another and different focal lengths, a stationary ocular having an optical axis disposed transversely to both of said parallel portions, and a total reflecting prism directing rays from either of said first named systems into said ocular and including a movable element permitting passage of rays from one of said systems past the axis of said ocular when the rays from the other of said systems are bent toward said ocular.

7. A telescope comprising an optical system having complementary mirrors spaced along the optical axis of said system, one of said mirrors containing a central aperture and the other of said mirrors being substantially aligned with said aperture, an optical accessory aligned with the optical axis of said system, a second optical system having a portion of its optical axis parallel with a portion of the axis of said first named system, an ocular having an optical axis transverse to the parallel portions of the optical axes of both said systems, and means for directing rays from either of said systems in the same direction into said ocular, said means including a prism movable into and out of alignment with said aperture, there being an unobstructed ray path from said aligned mirror to said accessory when said prism is moved out of alignment with said aperture.

8. A telescope comprising an optical system having complementary mirrors spaced along the optical axis of said system, one of said mirrors containing a central aperture and the other of said mirrors being aligned with said aperture, an optical accessory aligned with the optical axis of said system, a second optical system having its optical axis parallel with the axis of said first named system, an ocular having an optical axis transverse to the optical axes of both said systems, and a total reflecting prism movable into position to bend rays from said second system into said ocular and movable into position to direct rays from said first system into said ocular, the rays from both systems being directed by said prism in the same radial direction, there being a straight unobstructed ray path from said aligned mirror to said accessory when said reflector is positioned to bend rays from said second system into said ocular.

9. A telescope comprising an optical system having complementary mirrors spaced along the optical axis of said system, one of said mirrors containing a central aperture and the other of said mirrors being substantially aligned with said aperture, a second optical system having an optical axis parallel with a portion of such axis parallel with a portion of the optical axis of said first system and a focal length different from the focal length of said first system, an ocular having an optical axis transverse to the parallel portions of the optical axis of both of said optical systems, and means for directing rays in the same radial direction from either of said optical systems toward said ocular and including a total reflecting prism movable into and out of alignment with said aperture, there being a straight unobstructed ray path from said aligned mirror to the image plan thereof when said prism is out of alignment with said aperture.

10. A telescope comprising an optical system having complementary mirrors spaced along the optical axis of said system, one of said mirrors containing a central aperture, a second optical system having an optical axis parallel with a portion of such axis parallel with a portion of the optical axis of said first system and a focal length different from the focal length of said first system, an ocular having an optical axis transverse to the parallel portions of the optical axis of both of said optical systems, and a reflector movable into and out of alignment with the optical axes of either of said systems for directing rays therefrom along the optical axis of said ocular.

11. A telescope comprising a barrel containing a high power optical system including spaced mirrors having complementary curved coaxial surfaces whose optical axis is parallel with the axis of said barrel, a housing connected with the end of said barrel opposite to the end through which rays enter said telescope, said housing and the adjacent end of said barrel containing viewing openings aligned with said optical axes, an ocular in the periphery of said housing and having an optical axis transverse to said first optical axis, means forming a low power optical system carried by said housing and having an optical axis which is parallel for a portion of its length with a portion of said first named optical axis and including a reflector adjacent to said second named optical axis and directing rays passing along said third named optical axis into substantial coincidence with said second named optical axis, and a total reflecting prism movable in said housing across said first named optical axis and along said coincident optical axes and into and out of alignment with said openings; the positioning of said prism in alignment with said viewing openings and adjacent to said reflector respectively permitting alternate viewing of the field of view of either of said optical systems from said ocular and positioning of said prism away from said viewing openings permitting viewing of the field of view of said first optical system through said openings and simultaneous viewing of the field of view of said second optical system through said ocular, the focal planes of the two optical systems being then transverse to one another.

References Cited in the file of this patent

UNITED STATES PATENTS

| | | |
|---|---|---|
| 828,511 | Saegmuller | Aug. 14, 1906 |
| 1,159,731 | Akeley | Nov. 9, 1915 |
| 1,679,661 | Hugershoff | Aug. 7, 1928 |
| 2,413,286 | Buchele | Dec. 31, 1946 |
| 2,504,383 | Bouwers et al. | Apr. 18, 1950 |
| 2,536,866 | Barcus | Jan. 2, 1951 |
| 2,604,832 | Barcus | July 29, 1952 |

FOREIGN PATENTS

| | | |
|---|---|---|
| 9,072 | Great Britain | of 1900 |
| 49,621 | Austria | Aug. 25, 1911 |
| 167,443 | Great Britain | Nov. 24, 1921 |
| 37,558 | France | Sept. 23, 1930 |
| | (1st addition to No. 686,007) | |
| 578,361 | Germany | June 13, 1933 |
| 646,440 | Germany | June 17, 1937 |